United States Patent [19]

Williams

[11] Patent Number: 4,944,873
[45] Date of Patent: Jul. 31, 1990

[54] DEWATERING SYSTEM FOR SLUDGE REMOVAL

[76] Inventor: Jack R. Williams, Box 207, Westport, Wash. 98595

[21] Appl. No.: 296,447

[22] Filed: Jan. 12, 1989

[51] Int. Cl.⁵ .............................................. B01D 24/14
[52] U.S. Cl. .................................... 210/209; 209/404; 210/323.1; 210/406; 210/513; 210/534
[58] Field of Search ..................... 108/147; 182/141; 210/188, 297, 384, 388, 396, 400, 401, 406, 413, 415, 416.1, 433.1, 209, 323.1, 513, 534; 219/298, 526, 539, 771, 803; 209/260, 404, 413

[56] References Cited

U.S. PATENT DOCUMENTS

| | | | |
|---|---|---|---|
| 3,768,657 | 10/1973 | Hoag | 210/298 |
| 3,873,450 | 3/1975 | Lovegreen | 210/400 |
| 3,899,426 | 8/1975 | Hirs | 210/400 |
| 3,970,549 | 7/1976 | Ennis et al. | 210/388 |
| 4,042,507 | 8/1977 | Langmack | 210/526 |
| 4,096,062 | 6/1978 | Myreen et al. | 210/400 |
| 4,137,062 | 1/1979 | Mullerheim et al. | 210/401 |
| 4,158,627 | 6/1979 | Ingemarsson | 210/400 |
| 4,192,747 | 3/1980 | Wykoff | 210/526 |
| 4,243,527 | 1/1981 | Leonard | 210/388 |
| 4,260,849 | 4/1981 | Greig et al. | 210/771 |
| 4,377,479 | 3/1983 | Pierson | 210/406 |
| 4,404,099 | 9/1983 | Austin | 210/396 |
| 4,581,136 | 4/1986 | Saalasti | 210/173 |
| 4,731,118 | 3/1988 | Johnson et al. | 210/400 |

Primary Examiner—Frank Spear
Assistant Examiner—Joseph Drodge
Attorney, Agent, or Firm—H. Albert Richardson, Jr.

[57] ABSTRACT

A dewatering system for use in the treatment of waste water which includes a tank, an inclined filter bed having a plurality of filter elements and means for inducing a flow of air through the filter bed to accelerate drying of the removed solids. Also disclosed are means for adjusting the angle of inclination of the filter bed and mechanical means for removing solids from the filter elements.

4 Claims, 3 Drawing Sheets

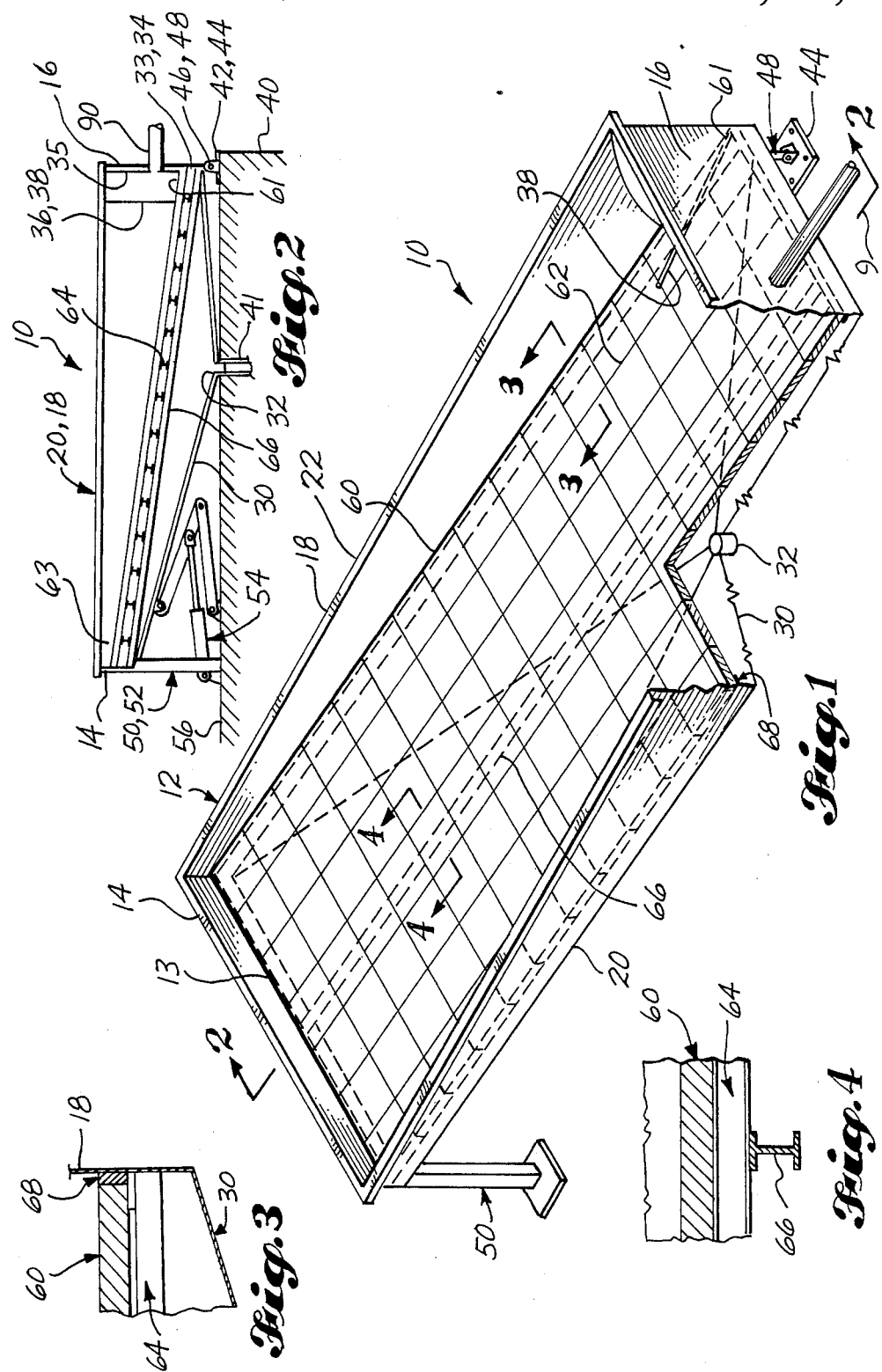

DEWATERING SYSTEM FOR SLUDGE REMOVAL

BACKGROUND OF INVENTION

This invention generally relates to waste water treatment and more particularly to a system for filtering solids from waste water and removing water from the solids.

In the conventional waste water treatment process one of the final steps involves the separation of solids from the water and the drying or "dewatering" of the removed solids (or sludge). Typically, this process includes the steps of chemically treating the waste water with a polymer known as a "flocking agent" to promote the aggregation of suspended solid particles. Next the treated waste water is fed into a tank or pond where the solids are permitted to settle. Finally, the water is drawn off, the solids are removed by mechanical means and dried.

Dewatering systems of this type are relatively slow and inefficient. The settling process requires about 24 hours at a minimum, thus limiting the amount of waste water that can be processed in any particular tank or pond. The systems include numerous moving parts and electric motors, so the operational and maintenance expenses are relatively high. For example, the direct operating cost of a system designed to process twenty thousand gallons per day is approximately $8.00 to $15.00 per thousand gallons of waste water processed.

Accordingly, it is an object of this invention to provide for a gravity dewatering system which will separate solids from waste water more rapidly than presently known systems.

It is the further object of this invention to provide for a gravity dewatering system which requires substantially less energy to operate than current systems.

Finally, it is yet another object of this invention to provide for a gravity dewatering system for waste water which involves fewer moving parts and thus has a lower operating cost than current systems.

SUMMARY OF THE INVENTION

This invention can be broadly summarized as providing for a gravity dewatering system for waste water treatment which includes a tank, a filter bed associated with the tank which is inclined with respect to the horizontal for removing solids from the waste water, and means for inducing air flow through the filter bed to facilitate drying of the removed solids.

In accordance with a more detailed aspect of this invention the filter bed is adjustably mounted for rotation to permit adjustment of the angle of inclination and includes a plurality of filters and a frame for supporting the filters.

In accordance with another aspect of this invention the system includes means for cleaning solids from the filters including an endless chain loop mounted above the filter bed and a plurality of spaced scrapers attached to the chain.

BRIEF DESCRIPTION OF THE DRAWINGS

FIG. 1 is a perspective view, partially cut away, of a dewatering system constructed in accordance with the teachings of the present invention.

FIG. 2 is a sectional view taken at 2—2 in FIG. 1.

FIGS. 3 and 4 are partial sectional views taken at 3—3 and 4—4, respectively, in FIG. 1.

DESCRIPTION OF THE PREFERRED EMBODIMENTS

Figure 5:
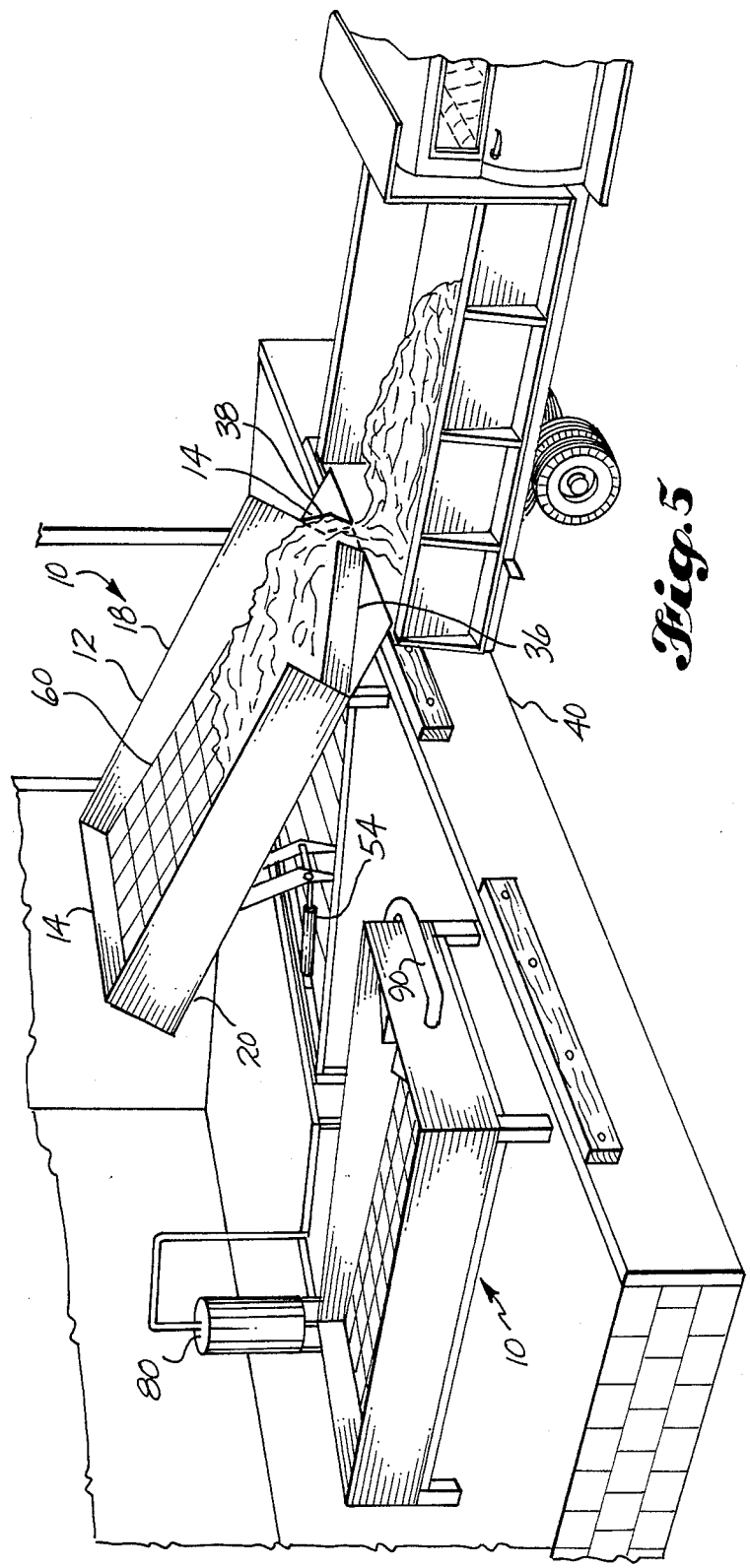
FIG. 5 is a perspective view showing the system of FIG. 1 elevated into a dumping position.

The novel features believed to be characteristic of this invention are set forth in the appended claims. The invention itself, however, may be best understood and its various objects and advantages best appreciated by reference to the detailed description below in connection with the accompanying drawings.

In FIGS. 1 through 6 of those drawings a dewatering system constructed in accordance with the teachings of the present invention is illustrated and generally designated by the numeral 10. As shown in FIG. 1, it includes a containment vessel or tank 12 which is formed of an upper wall 14, a lower wall 16, and two side walls 18 and 20, each preferably made of steel plate. The upper edge of each wall is reinforced by an angle member such as member 20. The tank also includes floor 30 which is formed of four pie shaped segments of steel plate which are welded at their intersections and to the adjoining tank walls. Together the segments form a floor which slopes downward in all directions toward drain 32. End 16 is pivotally mounted to the tank at points 33 and 34 and is appropriately sealed at its intersections with walls 18 and 20 and floor 30 to prevent leakage of waste water from the tank. Attached to inner surface 35 of end 16 are a pair of baffles 36 and 38 which are provided to direct the flow of sludge from the tank during cleaning operations as will be discussed below.

Normally the tank assembly is located on a structure such as cement dock structure 40 to facilitate removal of dried sludge from it as will be discussed later. The dock includes drain 41 in which drain 32 is removably seated. The tank is pivotally mounted near lower end 16 on pads 42 and 44 for rotation about points 46 and 48, respectively. On the opposite end near upper end 14 it rests on posts 50 and 52 which are fixedly mounted to the dock structure. Rotation of the tank is accomplished by hydraulicly powered scissors assembly 54 which is pivotally mounted to floor 30 and dock 40 as shown in FIG. 2. In the context of this disclosure the horizontal direction is assumed to be one parallel to planer upper surface 56 of dock 40 and the vertical direction is assumed to be one normal to that surface.

Mounted within the tank is filter bed 60 which is inclined to the horizontal and has a lower end 61 and an upper end 63. The filter bed includes a plurality of rectangular filter elements such as element 62 which rest atop a group of I-beams, such as beam 64, each of which extends between and is welded to walls 20 and 22. Each of these beams rests on I-beam 66 which is centrally located in the tank and extends between walls 14 and 16. Filter elements sold under the trade name Wedge Water® have been found to work effectively for normal treatment applications but other types of filters may be substituted. The size of the mesh is determined by the size of the suspended particles and their consistency. In order to prevent waste water from by-passing the filters near the tank walls, caulking 68 should be placed between the filter elements and the walls as shown in FIG. 3.

Preferably, the angle of inclination "a" of the filter bed with respect to the horizontal is 6° but the angle can be adjusted by varying the height of posts 50 and 52 or by actuating scissors assembly 54. Alternately, of course, the tank could be fixed in position and the bed could be pivotally mounted in the tank and rotated by some means to provide the adjustment.

In operation, before waste water enters the system a polymer known as a flocking agent is mixed with it to induce the aggregation of suspended solids as discussed earlier. Referring to FIG. 5 the polymer is stored near the tank in container 80 which is preferably made of plastic and has a capacity of approximately 100 gallons. A rotating paddle assembly powered by a small electric motor is installed in the tank to continuously agitate the polymer. In order to mix the agent and the waste water the agent is injected into the pipe carrying the waste water and the mixture is then passed through a series of 90° elbows as it approaches tank 12. The churning of the mixture as it passes through these elbows results in a thorough mixing of the agent and the waste water. Next the treated waste water flows into tank 12 through pipe 90 as shown in FIG. 2.

Water entering the tank through pipe 90 is discharged onto the upper surface of filters located near the lower end of the filter bed and passes downward through the filters, leaving the suspended solids deposited on the upper surface of the filter screens. If it does so it also tends to flow toward the upper end of the filter bed due to the direction and velocity of the flow entering the tank. The solids tend to initially collect on the screens located near the lower end of the tank, and as they do so they gradually reduce the flow of water through the screen. As a result, waste water entering the tank tends to flow over the filled screens and continues moving toward the unfilled screens located toward the upper end of the filter bed. The result of this process is a more efficient use of the entire filtering surface.

Water passing downward through the filters falls onto tank floor 30 and is directed by its sloping surfaces toward drain 32. Preferably the drain is sized so that it can accommodate the normal flow of water from the filter bed without filling completely. It has been found that as the waste water passes through the drain it will draw air from the lower part of the tank with it provided that the drain is not completely full. The removal of air from the tank results in air being drawn downward through the filter screen, thus creating a continuous flow of air across it. The effect of this air flow through the screen is to dramatically reduce the time required to dry the solids trapped on the upper surface of the filter screens. For example, a dewatering system according to this invention can dry sludge to a particular water content in approximately two hours, whereas the time required to achieve the same dryness using a conventional system with a comparably sized tank would be approximately 24 hours. The increased efficiency which can be achieved in the dewatering process by utilizing this invention is apparent.

Obviously, other means can be employed to induce a downward flow of air through the filter bed to reduce the drying time of the solids. For example, a vacuum pump could be attached to one or more vents located in the tank below the filter bed to draw air from the portion of the tank lying below the bed. Alternately, a cover could be placed over the tank and means could be provided to increase the air pressure above the filter bed.

When the screens in the filter bed are substantially full of solids the flow of waste water into pipe 90 is shut off and the pipe is disconnected from end 16. As soon as the solids have been dried to the desired water content the filter bed is ready to be cleaned and prepared for re-use. In order to do so, end 16 is opened and rotated into a horizontal position and the tank is elevated by means of the scissors assembly into an unloading position as shown in FIG. 5. In that position the filter bed is sloped downward sufficiently that with some assistance the solids will easily flow toward end 16. As they pass over end 16, they are guided by baffles 36 and 38 into a truck bed or other means of conveyance for disposal.

Figure 6:
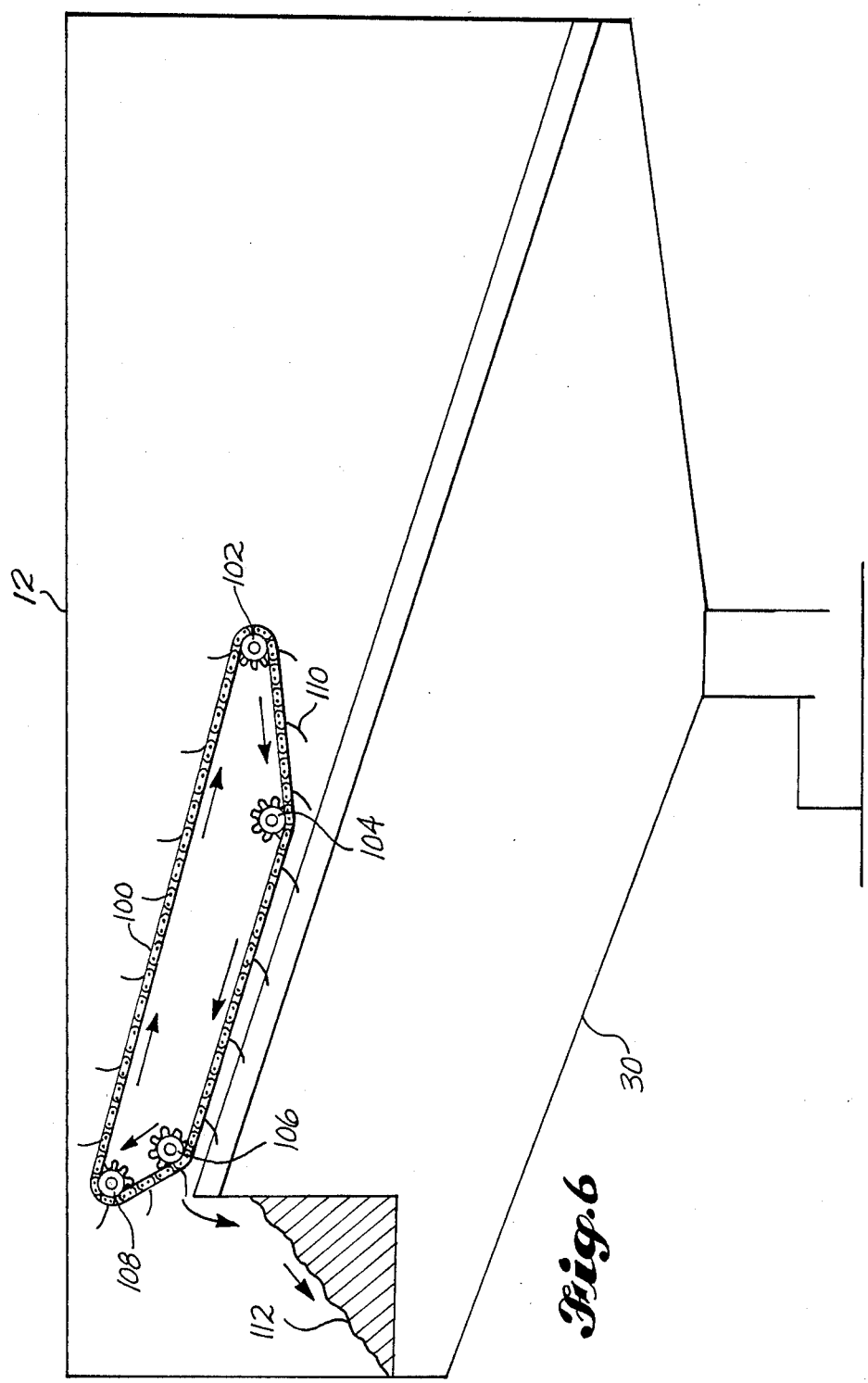
FIG. 6 illustrates another embodiment of the present invention including mechanical means for cleaning removed solids from the upper surface of the filter bed.

Another embodiment of this invention which includes a mechanical means for removing the solids from the upper surfaces of the filter screens is illustrated in FIG. 6. The cleaning device includes an endless chain 100 which is mounted for rotation on four sprockets 102, 104, 106 and 108. A plurality of equally spaced scrapers or squeegees such as squeegee 110 is mounted to the chain and the chain assembly is positioned such that scrapers moving between sprockets 104 and 106 will contact the upper surface of the screen. In operation, power is applied to sprocket 108 causing the chain to move in a direction indicated by the arrow. Solids accumulating on the upper surface of the filters between sprockets 104 and 106 will be transported upward along the filters by the squeegees and will be swept from the filter bed as they pass sprocket 106. At this point the solids will fall onto conveyer belt 112 where they will be transported for disposal. It has been found by experimentation that if the squeegees are moved at the rate of approximately 6 feet per minute the drying time of the sludge can be reduced to only a few minutes.

Thus it can be seen that the present invention provides for an improved dewatering system for waste water treatment which incorporates many novel features and offers significant advantages over the prior art. Although only two embodiments of this invention have been illustrated and described, it is to be understood that obvious modifications can be made in it without departing from the true scope and spirit of the invention.

I claim:

1. A dewatering system for use in the treatment of waste water comprising:
   a tank adapted to receive waste water;
   a filter bed disposed within the tank and adjustably inclined with respect to the horizontal for removing solids from the waste water as it is drawn downward through the bed by gravity, the bed including filter media which remain stationary with respect to the bed;
   means for discharging waste water into the tank above the filter bed;
   means for inducing a flow of air through the filter bed to facilitate drying of the removed solids; and
   means for adjusting the angle of inclination of the filter bed including a scissors linkage pivotally mounted to the filter bed and power means for actuating the linkage.

2. The dewatering system of claim 1 wherein the means for creating a differential air pressure includes means for reducing air pressure below the filter bed.

3. The dewatering system of claim 1 wherein the means for creating a differential air pressure includes means for increasing the air pressure above the filter bed.

4. A dewatering system for use in the treatment of waste water comprising a tank mounted for rotation and having a drain and a floor sloping downward toward the drain;

a filter bed disposed within the tank and inclined with respect to the horizontal for removing solids from the waster water, the filter bed having a pair or opposing sides sealably engaging the tank and a lower end extending between the sides, a generally planar array of filters which remain stationary with respect to the bed and a frame for supporting the filters;

means for discharging waste water on to filters proximate the lower end of the filter bed; and means for rotating the tank including a powered scissors linkage pivotally mounted to the tank and power means for moving the linkage.

* * * * *